United States Patent [19]

Crump et al.

[11] Patent Number: 4,469,663
[45] Date of Patent: Sep. 4, 1984

[54] SCALE CONTROL IN FLUE GAS DESULFURIZATION

[75] Inventors: Druce K. Crump, Lake Jackson; David A. Wilson, Richwood; Gary D. Gatton, Angleton, all of Tex.

[73] Assignee: The Dow Chemical Company, Midland, Mich.

[21] Appl. No.: 434,676

[22] Filed: Oct. 15, 1982

[51] Int. Cl.³ .................. C01B 17/00; C02F 5/10
[52] U.S. Cl. .................. 423/242; 423/243; 423/512 A; 423/555; 252/180
[58] Field of Search ............ 423/242 A, 242 R, 243, 423/244 A, 244 R, 512 A, 555, 166; 252/180

[56] References Cited

U.S. PATENT DOCUMENTS

| | | | |
|---|---|---|---|
| 3,303,139 | 2/1967 | Blaster et al. | 252/180 |
| 3,883,639 | 5/1975 | Cronkright et al. | 423/242 |
| 4,003,848 | 1/1977 | Cotter et al. | 423/244 |
| 4,100,256 | 7/1978 | Bozelli et al. | 423/243 |
| 4,118,318 | 10/1978 | Welder et al. | 210/58 |
| 4,148,615 | 4/1979 | Agarwal et al. | 55/73 |
| 4,150,096 | 4/1979 | Nelms et al. | 423/242 |
| 4,171,292 | 10/1979 | Jones et al. | 423/242 |
| 4,177,245 | 12/1979 | Rosenberg et al. | 423/242 |
| 4,213,946 | 7/1980 | Furuta et al. | 423/242 |
| 4,216,087 | 8/1980 | Long et al. | 210/58 |
| 4,310,348 | 1/1982 | Stelhammer et al. | 423/243 X |
| 4,336,233 | 6/1982 | Appl et al. | 423/242 |
| 4,388,281 | 6/1983 | Holter et al. | 423/242 |

*Primary Examiner*—Gregory A. Heller

[57] ABSTRACT

An improvement in a process for flue gas desulfurization in which particular phosphonomethylated derivatives of aminoethylpiperazine, employed as threshold agents, prevent calcium scale formation in the contacting section but permit precipitation of calcium compounds at a later stage.

8 Claims, 1 Drawing Figure

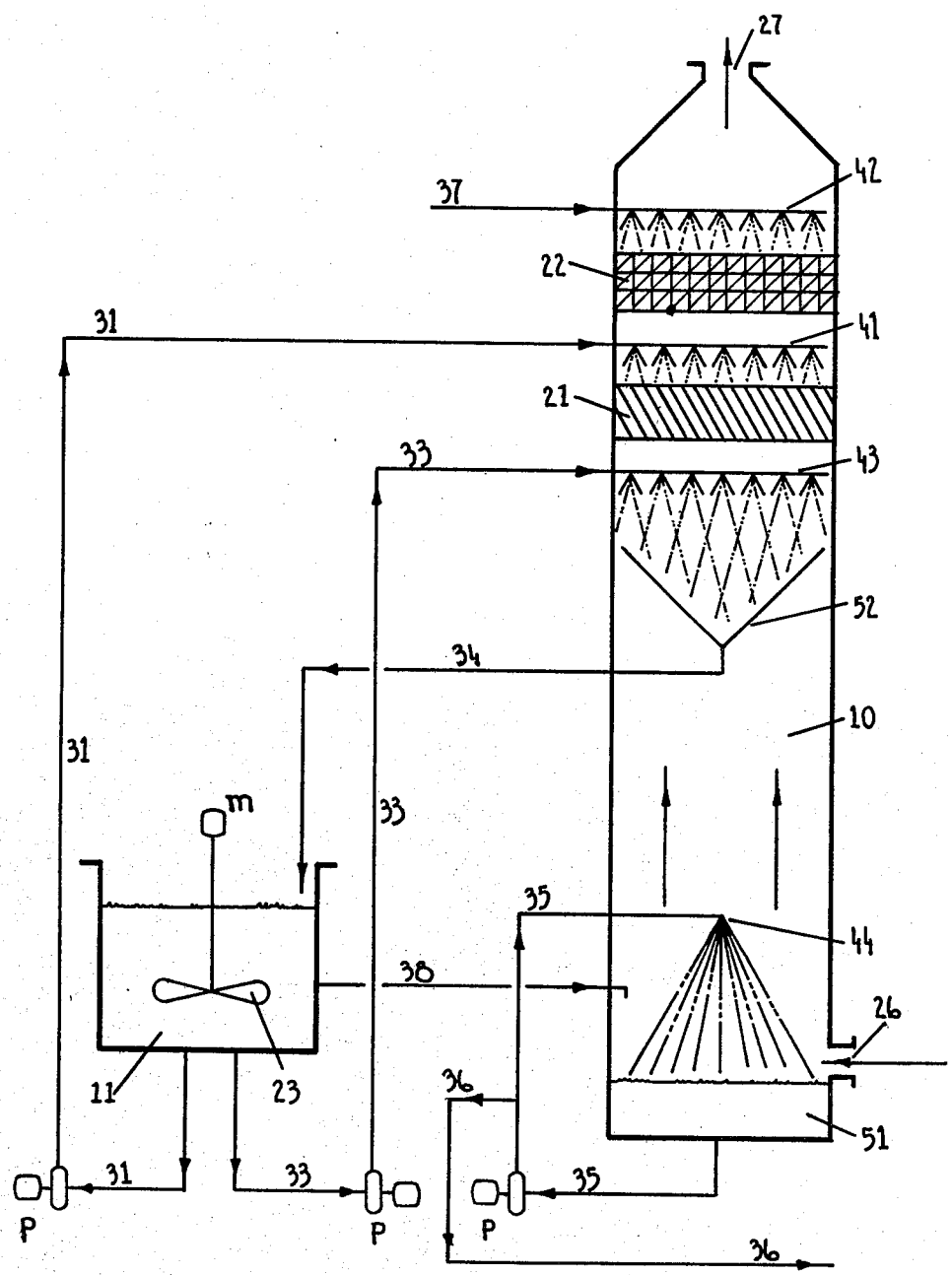

SCALE CONTROL IN FLUE GAS DESULFURIZATION

BACKGROUND OF THE INVENTION

Power plants which burn carbonaceous fuels, especially soft coal, as a source of energy must scrub the gases from the burning fuel to remove sulfur oxides in order to avoid pollution of the atmosphere. The use of limestone ($CaCO_3$) as an aqueous slurry has long been employed for the purpose of scrubbing the sulfur oxides from the flue gas. Normally it is employed in towers which contact the gas with the calcium carbonate slurry in a countercurrent manner. The reaction between the sulfur oxides in the gas and the aqueous slurry of calcium carbonate forms a precipitate of calcium sulfite and sulfate, thus removing sulfur from the gas stream.

One of the problems in removing the sulfur oxides by reacting with the calcium carbonate, or other soluble alkaline earth metal salts, is that when the metal sulfate precipitates it forms scale on the contacting surfaces. Thus, it is desirable that the scale be prevented from depositing during the contacting process, but that it subsequently be allowed to precipitate and be separated from the solution. Thus, the solution can be reconstituted and recycled to the process of removing the sulfur oxides from the flue gas without recycling a major portion of the scalant.

In the past, various methods have been tried to inhibit the scale or counteract its effect. Thus, intermittent washing of the contacting surfaces was attempted, but was useful only with low gas volume or low sulfur content of the gas. When chelating or threshold agents were employed, the scale was prevented from forming during the contacting stage, but then could not be easily precipitated in the settling tanks unless the threshold or chelation limits were exceeded. In this the scale would form in both the contacting stage and the settling tanks.

It would be desirable to find a means by which the metal ions could be maintained in solution during the contacting phase to avoid scale formation, but then be permitted to precipitate so that their sulfate salts could be removed.

The present invention provides just such a method. Particular methylenephosphonates have been discovered which will keep the metal ions in solution during the contacting phase and allow precipitation in a subsequent step.

SUMMARY OF THE INVENTION

Certain heterocyclic amine polymers which have been methylenephosphonated have been found to be particularly useful in a flue gas desulfurization process in which the subject polymers act as threshold agents in the control of metal ions in the gas-contacting step of the process, but allow subsequent precipitation of these ions as sulfates in a later step.

DETAILED DESCRIPTION OF THE INVENTION

The polymeric methylenephosphonated amines, primarily dimers and trimers of aminoethylpiperazine (AEP), are made by reacting a dihalo or epoxyhalo compound with the AEP and subsequently phosphonomethylating the resulting mixture to obtain a product which is represented by the formula

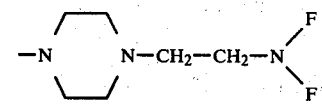

wherein A is an organic radical having the formula

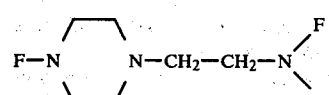

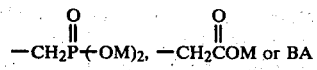

wherein F is hydrogen, hydroxyethyl, hydroxypropyl,

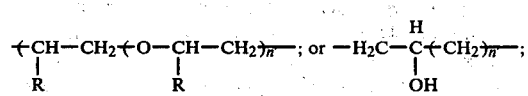

wherein M is hydrogen, an alkali metal or ammonium, and wherein B is a divalent radical derived from a dihalo or haloepoxy organic compound having one of the following structures $$-(CH_2)_{\overline{n}};\ -(CH_2)_{\overline{n}}-O-(CH_2)_{\overline{n}}-;$$

$$-(CH-CH_2)-(O-CH-CH_2)_{\overline{n}}-;\ \text{or}\ -H_2C-\overset{H}{\underset{OH}{C}}-(CH_2)_{\overline{n}}-;$$
$$\ \ \ \ \ \ R\ \ \ \ \ \ \ \ \ \ \ \ \ \ \ R$$

and wherein n is 1 to 10; n' is 1 to 3; R is hydrogen or methyl; and m is 1 to 10 and at least 50% of the F groups are

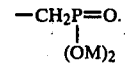

Details of the process for making the threshold active compounds are disclosed in copending application Ser. No. 425,025, filed Sept. 27, 1982 under the title "POLYMERIC ALKYLENEPHOSPHONIC ACID PIPERAZINE DERIVATIVES". Example 1 below is representative of the method of preparation of these compounds disclosed in the above identified application.

The threshold active compounds of the invention are effective in preventing precipitation of metal ions, e.g. $Ca^{++}$ as scale, when water soluble compounds containing these metals are employed in aqueous scrubbing solutions employed to scrub sulfur oxides from flue gas from the burning of sulfur-containing hydrocarbon fuels.

The compounds useful in the invention are effective in preventing metal ion precipitation at temperatures up to about 70° C. At higher temperatures they are less effective and will allow $CaSO_4$ to precipitate in solutions containing $SO_4^=$ and $Ca^{++}$ ions.

This special property allows their use in the above described flue gas desulfurization process wherein the flue gases are contacted with an aqueous solution or slurry of calcium compounds, e.g. $CaCO_3$ or $Ca(OH)_2$, or other metal compounds which will remove $SO_2$ and $SO_3$ from gas streams contacted therewith. Following such contact, and in accordance with the present invention wherein these ions are prevented from precipitating as the metal sulfates during the contacting by the presence of the subject threshold agents, a portion of the aqueous solution is circulated to a quench sump wherein it is heated to a temperature sufficient to reduce the activity of the threshold agent, (usually to above about 70° C.) and cause precipitation of the metal ions as sulfates. A side stream containing the precipitated sulfates is withdrawn and sent to a thickener and subsequently disposed of.

The amount of threshold agent, i.e. the phosphonomethylated AEP polymeric products, usually employed is from about 0.5 to about 500 ppm depending upon the particular agent and upon the amount of metal ions present in solution, which in turn depends upon the volume of gas and concentration of sulfur oxides therein.

The FIGURE is a schematic diagram of a typical absorber tower and associated equipment employed in a gas desulfurization process. In the FIGURE is shown an absorbent tower 10 and a feed tank 11. In the feed tank 11 is contained stirring means 23 driven by motor m. In absorber tower 10 is packed section 21 for contacting gas and liquid, and a second packed section 22 for demisting the gas prior to exiting outlet pipe 27. The gas to be desulfurized enters the tower 10 through inlet pipe 26. Conduits 31 and 33 for circulating liquid lead from feed tank 11 to absorber tower 10 and conduit 35 for recirculating liquid from quench sump 51 leads to tower 10; liquid distributor means, e.g. spray nozzles 41, 42, 43 and 44 are connected to conduits 31, 37, 33 and 35, respectively. Distributor means 41 and 43 conduct absorbing solution (slurry) to packed section 21 and into collector 52 in order to contact the gas coming into tower 10 via pipe 26. Distributor means 42 conducts water into packed section 22 to remove particulate moisture from the upwardly flowing gas prior to its exit via pipe 27. Distributor means 44 sprays a slurry from quench sump 51 which contacts and cools gas entering the bottom of the column through pipe 26. Conduit 38 is an overflow pipe to the feed tank which leads to the quench sump 51. Collector 52 carries substantially all of the absorbing liquid admitted to tower 10 via conduits 31 and 33 and returns it to feed tank 11 via conduit 34. An overflow conduit 38 permits replenishment of the quench sump 51 from feed tank 11 as needed when portions of the quench sump bottoms are sent to a thickener (not shown) via conduit 36. Pumps in the system are indicated by the letter p.

In the operation of the flue gas desulfurization process the threshold agent of the present invention is added to the aqueous feed in tank 11 or into the feed in conduit pipes 31 and 33 at a point just prior to their entrance into tower 10. The aqueous solution and/or slurry of $CaCO_3$ is fed into the upper portion of tower 10 from feed tank 11 via conduits 31 and 33 and through distributors 41 and 43. The gas stream to be desulfurized enters tower 10 at its lower end through pipe 26 at a temperature of about 85° C. where it first contacts quench liquid from quench sump 51 which is pumped via conduit 35 to distributor 44. From thence the gas flows upwardly to contact sprayed liquid emanating from distributors (spray nozzles) 44 and 41, the latter spraying the liquid onto packed section 21. The flue gas, having had substantially all the sulfur oxides removed therefrom, is then passed through a second packed section 22 where it contacts water from conduits 37 which is sprayed through distributor 42. This effectively removes any particulate moisture and any slurry remaining in the gas stream, which then passes out the top of the tower through pipe 27 and is vented to the atmosphere. The absorber liquid having been contacted by the gas stream falls toward the bottom of the tower, but a substantial part is caught by collector 52 and is carried back to feed tank 11 via conduit 34. The level of sump 51 is maintained by adding absorber liquid from feed tank 11 via conduit 38. This is necessary because a portion of the sump recycle in conduit 35 is taken off in either continuous or intermittent manner and sent to a settling tank or thickener (not shown) where the calcium sulfate is removed and the water taken off and recycled to the process via conduit 37.

The following examples illustrate the preparation and use as threshold agents of the phosphonomethylated amines as well as comparative examples employing the products known to the art for such use.

In the above described gas desulfurization process, the temperature achieved during the contacting step in the upper portion of the tower is normally 55°–60° C. while the temperature in the quench sump is typically 70°–80° C. An ideal inhibitor should prevent deposition in the packed (contact) section of the tower but allow precipitation to occur in the sump.

EXPERIMENTAL

Conditions found in the above described desulfurization process were simulated in the laboratory using the following apparatus: a packed column was connected at its upper and lower ends by tubing to a vessel containing a supersaturated solution of calcium sulfate (initial pH 3.5-4). This solution was circulated through the column by introducing the said solution at its upper end and returning it through the tubing connecting its lower end to the said vessel. The column was packed with pieces of polyethylene tubing, 0.375" long×0.375" diameter (0.95 cm×0.95 cm). Precipitation of calcium sulfate scale on the packing was noted with time and calcium remaining in solution was determined by filtering a sample of the solution through a millipore filter and titrating with standard disodium ethylenediaminetetraacetate. While circulating at a temperature of 54° C. without any scale inhibitor, nearly half the calcium sulfate present had precipitated, forming scale, within 30 minutes to one hour. The amount of $CaSO_4$ present in solution at the start of the test was 3985 ppm, after 30 minutes circulation only 2162 ppm remained and 2067* ppm after 70 minutes.

*This is approximately the amount in a saturated solution of $CaSO_4$ at 54° C.

The following example shows the preparation of a typical threshold product useful in the process of the present invention.

EXAMPLE 1

(Preparation of threshold product)

An aminoethylpiperazine (AEP) based amine was prepared by reacting 22.7 g of aminoethylpiperazine (0.176 mole), 9.8 g of ethylene dichloride (EOC, 1,2-dichloroethane (0.099 mole), and 17.5 g of deionized water (EDC/AEP mole ratio=0.56) in a 500-ml round-bottom reaction flask equipped with a water-cooled reflux condenser, mechanical stirrer, thermometer with a temperature controller, and an addition funnel. The reaction product was then phosphonomethylated by adding approximately 75 g of concentrated hydrochloric acid and 32.6 g (0.40 mole) of phosphorous acid to the aqueous amine solution and the reaction mixture heated to reflux and maintained for one hour. Aqueous 37% formaldehyde solution, 28.1 g (0.35 mole), was added through the addition funnel over a one and one-half hour period. The reaction mixture was heated at reflux for an additional three hours and then cooled. The product was evaluated by employing it in the laboratory circulating apparatus described above.

EXAMPLE 2

The product of Example 1 was evaluated in the above-described test equipment at 10 ppm (active acid) at temperatures of 54° C., 75° C., and 90° C. The data is summarized in Table I. The data indicates the effectiveness of the EDC/AEP phosphonate inhibitor. It prevents deposition of scale at 54° C. (as in the contacting section) but then allows the calcium sulfate to precipitate on heating (as in the sump section).

TABLE I

| Time | ppm soluble CaSO$_4$ at | | |
|---|---|---|---|
| (min.) | 54° C. | 75° C. | 90° C. |
| 0 | 4026 | 3998 | 3890 |
| 60 | 3808 | 3482 | 2500 |
| 120 | 3740 | 3100 | — |
| 180 | 3700 | — | — |

EXAMPLE A
(Comparative)

A supersaturated solution of calcium sulfate was prepared containing 10 ppm of aminotrimethylenephosphonic acid (ATMPA), a commercially available organophosphonic acid inhibitor. The solution was circulated at 54° C. and titrated periodically for soluble calcium. The same thing was done, but employing a commercially available aminomethylenephosphonic acid, diethylenetriaminepentamethylenephosphonic acid (DETA-MPA), again at 10 ppm based on the weight of solution. The results are tabulated in Table II.

TABLE II

| Time | ppm soluble CaSO$_4$ at | | |
|---|---|---|---|
| | ATMPA | DETA-MPA | |
| (min.) | 54° C. | 54° C. | 75° C. |
| 0 | 3971 | 4134 | 4189 |
| 60 | 3672 | — | — |
| 120 | 3346 | 4120 | 4107 |
| 240 | 2802 | — | 3987 |
| 360 | — | 3944 | — |

A significant amount of calcium sulfate had accumulated on the packing with ATMPA after 1-2 hours. This data indicates that the inhibitor is not effective in maintaining the calcium in solution, i.e. preventing scale formation, in the packed contacting section of the desulfurization process described. Very little calcium sulfate scale was noticed on the packing when using DETA-MPA either at 54° C. or 75° C. This shows that the diethylenetriaminepentamethylenephosphonic acid was effective at controlling scale formation at 54° C. in the same packed contacting section but would not allow precipitation to occur on heating at 75° C. as in the sump section of the described process. A repeat run at 90° C. did not result in deposition of calcium sulfate.

Aminoethylpiperazine, the compound from which the methylenephosphonate of the present invention is made, was reacted with formaldehyde and phosphorous acid to make its trimethylenephosphonic acid derivative. This was used at 10 ppm (active acid) as in Comparative Example A. Little, if any, calcium sulfate scale was observed on the packing at either 54° or 75° C. As in Comparative Example A, the aminoethylpiperazine-trimethylenephosphonic acid inhibitor is not suited for use in the desulfurization unit since it would not allow the calcium sulfate to precipitate at 75° C., but kept it in solution at both temperatures.

EXAMPLE 3

An aminoethylpiperazine derived amine was prepared by reacting aminoethylpiperazine and ethylenedichloride in an EDC/AEP mole ratio of 0.80. The product was phosphonomethylated with phosphorous acid and formaldehyde in the presence of hydrochloric acid to give the methylenephosphonic acid derivative. The product was evaluated at 10 ppm (active acid) at temperatures of 54° C. and 75° C. as in Example 2. Results are shown in Table III.

TABLE III

| Time | soluble CaSO$_4$ (ppm) at | |
|---|---|---|
| (min.) | 54° C. | 75° C. |
| 0 | 3998 | 3971 |
| 60 | 3781 | 3563 |
| 120 | 3822 | 3495 |
| 240 | 3726 | 2951 |

The compounds that have been shown to be effective in the process are methylenephosphonic acids derived from the phosphonomethylation of aminoethylpiperazine-ethylenedichloride reaction products. In addition to the acid derivatives themselves various metal and alkali metal salts; ammonium and amine salts; partial salts of the methylenephosphonic acids; and mixtures thereof can be employed.

The preferred products are those that have had the aminohydrogens fully replaced by methylenephosphonic acid groups. However, some aminohydrogens can be left unreacted if desired. Also, functionality in addition to the methylenephosphonic acid group can be incorporated into the compounds. Typical groups are hydroxyalkyl, methylenesulfonate, hydroxypropylsulfonate, carboxymethyl, etc.

In addition to ethylenedichloride, other alkylene dihalides, which may be saturated or unsaturated, aralkylene dihalides or dihalo ethers, and epoxyhalides, such as epichlorohydrin, can be used to react AEP to prepare the amines which are then phosphonomethylated.

Thus, the present invention is an improvement in the process of gas desulfurization in which the gas is contacted with an aqueous solution or slurry of a calcium salt or hydroxide to remove the sulfur oxides contained therein. This contact causes the formation of calcium sulfate which precipitates as scale on the surfaces wherein the contact occurs. The invention is to employ a particular threshold agent which will inhibit the scale formation on the contact surfaces, but permit it to occur in another part of the system.

Since, in the system described herein, the contact occurs at a lower temperature than in the quench section, it was discovered that a particular threshold agent which was effective at these contact temperatures, became less effective at the higher temperatures found in the quench. Thus, it was advantageous to use this agent to inhibit scale formation on the contact surfaces since it would allow precipitation of the scale in a later stage so that it could be removed and disposed of satisfactorily.

We claim:

1. In a process of gas desulfurization wherein a hot gas containing sulfur oxides is passed into a vapor-liquid contacting column where said gas is (1) quenched in a first stage by contacting said gas with an aqueous solution or slurry containing a calcium compound which will react with said sulfur oxides, (2) further contacted at a temperature of up to about 70° C. in one or more stages with additional said solution or slurry to react with substantially all remaining said sulfur oxides, and (3) heating said solution or slurry from step 2 to a temperature of above about 70° C. to precipitate the reaction product of said sulfur oxides with said calcium compounds the improvement which comprises adding to said aqueous contacting solution or slurry a threshold agent having the formula

wherein A is an organic radical having the formula

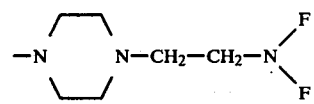

or

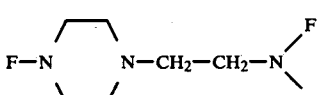

wherein F is hydrogen, hydroxyethyl, hydroxypropyl,

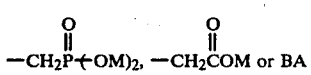

wherein M is hydrogen, an alkali metal or ammonium, and wherein B is a divalent radical derived from a dihalo or haloepoxy organic compound having one of the following structures

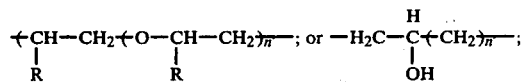

and wherein n is 1 to 10; n' is 1 to 3; R is hydrogen or methyl; and m is 1 to 10 and at least 50% of the F groups are

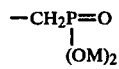

which will inhibit the formation of scale at the lower temperature of step 2, but permit its precipitation at a higher temperature.

2. The process of claim 1 wherein the calcium compound is calcium carbonate.

3. The process of claim 1 wherein F is

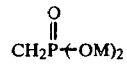

and m is 1–3.

4. The process of claim 1 wherein the gas from step 2 is contacted with water or an aqueous solution of said calcium compound to remove particulate moisture from said gas.

5. The process of claim 4 wherein step 3 is accomplished by recycling said contacting solution or slurry to step 1 where it contacts said hot gas.

6. The process of claim 5 wherein said contacting solution from step 1 is separated from the precipitated reaction product and said solution recycled to remove particulate moisture.

7. A process of gas desulfurization wherein a hot gas containing sulfur oxides is passed into a vapor-liquid contacting column where said gas is (1) quenched in a first stage by contacting said gas with an aqueous solution or slurry containing a calcium compound which will react with said sulfur oxides, (2) further contacted at a temperature of up to about 70° C. in one or more stages with additional said solution or slurry to react with substantially all remaining said sulfur oxides, and (3) heating said solution or slurry from step 2 to a temperature of above about 70° C. to precipitate the reaction product of said sulfur oxides with said calcium compounds and wherein a threshold agent, which will inhibit the formation of scale at the lower temperature of step 2, but permit its precipitation at the higher temperature of step 3, is added to said aqueous solution or slurry with which said hot gas is contacted, said threshold agent having the formula

wherein A is an organic radical having the formula

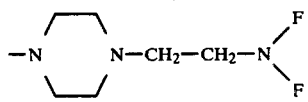

or

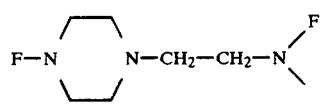

wherein F is hydrogen, hydroxyethyl, hydroxypropyl,

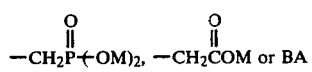

wherein M is hydrogen, an alkali metal or ammonium, and wherein B is a divalent radical derived from a dihalo or haloepoxy organic compound having one of the following structures

-continued
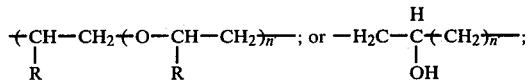
and wherein n is 1 to 10; n' is 1 to 3; R is hydrogen or methyl; and m is 1 to 10 and at least 50% of the F groups are
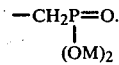
8. The process of claim 7 wherein B is a divalent radical derived from 1,2-dichloroethane and m is 1 to 4.
* * * * *

UNITED STATES PATENT AND TRADEMARK OFFICE
CERTIFICATE OF CORRECTION

PATENT NO. : 4,469,663
DATED : September 4, 1984
INVENTOR(S) : Druce K. Crump, David A. Wilson and Gary D. Gatton It is certified that error appears in the above—identified patent and that said Letters Patent is hereby corrected as shown below:

Column 2, line 1 and Column 8, line 39, the formula should read as follows:

$$A\!-\!(\!-\!BA)_m$$

Column 3, line 64, delete "44" and insert --43--.

Column 3, line 68, delete "conduits" and insert --conduit--.

Column 4, line 61, delete "EOC" and insert --EDC--.

Signed and Sealed this

Sixteenth Day of April 1985

[SEAL]

Attest:

DONALD J. QUIGG

Attesting Officer   Acting Commissioner of Patents and Trademarks